Aug. 25, 1964 F. JONKER 3,145,589

COMBINED DRILL GUIDE AND INSPECTION DEVICE

Filed March 14. 1961

United States Patent Office 3,145,589

Patented Aug. 25, 1964

3,145,589

COMBINED DRILL GUIDE AND INSPECTION DEVICE

Frederick Jonker, Washington, D.C., assignor to Jonker Business Machines, Inc., a corporation of Delaware Filed Mar. 14, 1961, Ser. No. 95,640

3 Claims. (Cl. 77—62)

This invention pertains to information retrieval systems based on the use of superimposable matrix cards dedicated to terms, and the determination of coincidences of holes in said cards. These systems are also known as "peekaboo" systems. Commercially they are known as "Termatrex" systems.

In such systems, an item of information is prepared for entry into the system by first indexing it by a number of terms taken from a vocabulary of terms. Each item of information is given an accession or serial number.

Peekaboo systems comprise a number of cards, each card being dedicated to a particular vocabulary term. In total there will generally be a vocabulary of between 500 and 5000 terms. On each term card there generally is one place dedicated to a document in the collection. Each document has the same position dedicated to it on each term card.

Items of information are entered into a peekaboo system by selecting all of the term cards by which that item has been indexed, and punching all of these cards at the position dedicated to that item of information. Terms can be words, classes, letters, numerals, or any description or properties of any kind.

A search is made by selecting a number of the cards corresponding to the desired search terms, usually 2 to 4 cards, superimposing the same, and scanning these for coinciding holes in all of the superimposed cards. After that, these cards are placed back in the files.

The present invention is a continuation-in-part of my earlier invention, described and claimed in my U.S. Patent 3,052,150, issued September 4, 1962, and provides an improvement which results in greater ease of operation.

This invention provides a data input and read-out device comprising a motor driven twistdrill, a fixed ruler bar with a scale and a movable ruler arm with a scale, whereby the movable ruler arm can be hooked into a number of positions along the fixed ruler bar, in such a manner that together, they can be used for both read-out and data input, the movable ruler arm serving as a readout as well as a drill template.

The invention will now be explained with reference to the following figures of the drawing.

Figures 1, 2:
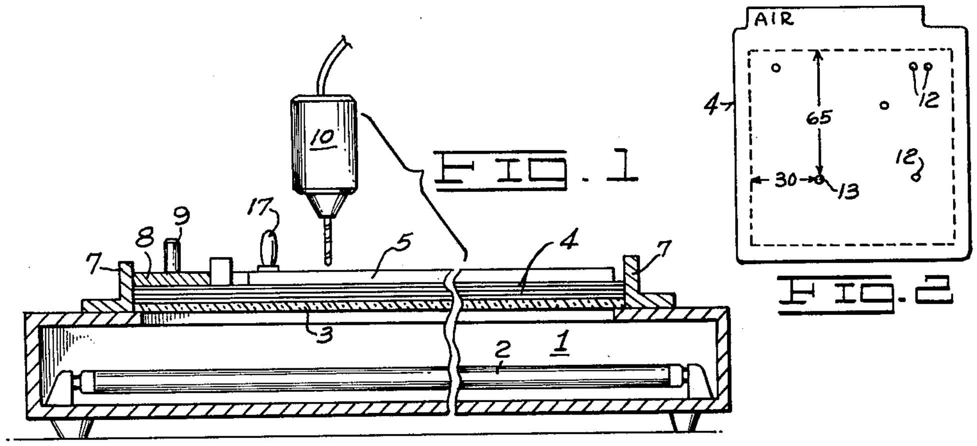
FIGURE 1 shows the entire device in vertical section.
FIGURE 2 shows in plan view an example of a term card.

FIGURE 1 shows a lightbox 1 with fluorescent lamps 2, on top of which are card-edge alignment blocks 7, to hold the term cards 4 in accurate superimposition. A translucent diffuser plate 3 diffuses the light from the lamps 2.

On top of the term cards 4 is a ruler arm 5 and a ruler bar 8. Ruler bar 8 is removably mounted between two pins 9. Ruler arm 5 acts as a cursor and can be moved up and down parallel to itself along ruler bar 8. Motor driven drill 10 is used to drill holes in the superimposed cards, utilizing holes 15 in ruler arm 5 as guide holes. When drilling holes in superimposed term cards, a so-called backup plate is first placed on top of diffuser plate 3. The point of the drill 10 can run into it without damaging the diffuser plate. This backup plate is not shown in FIGURE 1.

FIGURE 2 shows an example of a term card dedicated to the term "AIR." Within the area indicated by dash lines, is a matrix of 100 by 100 positions. Numerals 12 designate holes in this area. The assignment of serial numbers to these positions is based on an $x$—$y$ coordinate system. For example, the serial numeral of hole 13, having 30 and 65 respectively as $x$ and $y$ coordinates, is #6530. There are other ways of assigning serial numbers to holes, and there are also systems where more than one hole is assigned to each document. However, the invention applies to all of these.

Figures 3, 4, 5, 6:
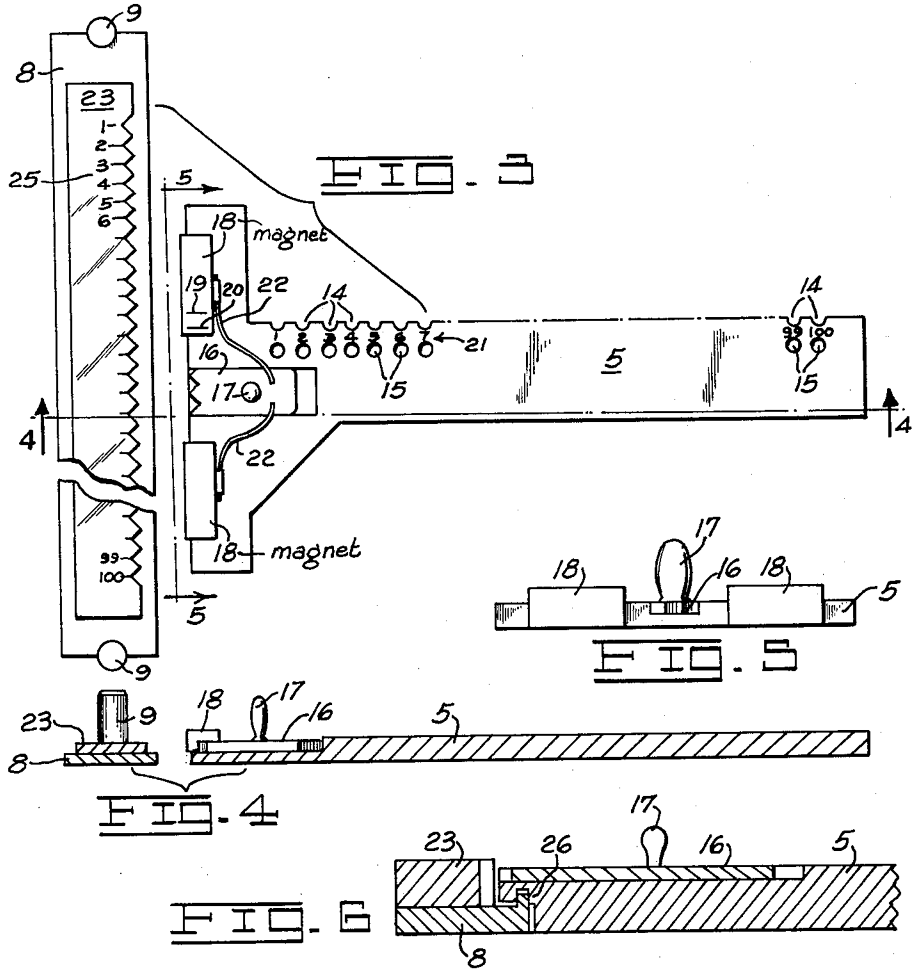
FIGURE 3 is a top view of the ruler arm and the ruler bar, shown separated for clarity.
FIGURE 4 is a sectional view of the rulers taken on line 4—4 of FIGURE 3.
FIGURE 5 is a view looking in the direction of arrows 5—5 of FIGURE 3.
FIGURE 6 is a fragmentary section of a modified sliding connection between the rulers.

FIGURE 3 shows a top view of the ruler arm 5 and the ruler bar 8 separated for clarity. Numerals 14 designate spaced half holes, or semicircular indentations, corresponding to the positions on the term cards. If a straight edge were used here it would be necessary to bisect the holes visually to get a correct reading. However, the half holes 14 in ruler arm 5 make unambiguous readings possible. The holes 15 can be used as drill templates for data input. Numerals 21 designate the numbers on the $x$-scale.

The ruler arm 5 of the cursor is held in contact with ruler bar 8 by two permanent magnets 18. They maintain contact, but allow ruler arm 5 to be slid up and down along ruler 8. It can be locked in any desired position along the $y$-scale, by means of a toothed element or slide 16, having knob 17. It is normally held in engagement, through the pressure of springs 22, with a serrated edge of a bar 23 along the ruler bar 8. The bottom section of ruler bar 8 must be made of steel since it engages the permanent magnets 18.

For data input the scale 25 on ruler bar 8 is read off by means of mark 20. For read-out, mark 19 is to be used, since the centerline of indentations 14 is spaced one tooth-width from the centerline of the holes 15.

Instead of keeping the ruler arm 5 and the ruler bar 8 in contact by means of permanent magnets, other means can of course be used. FIGURE 6 shows an example of such means, namely a matching ridge and groove at 26.

The invention encompasses all of the modifications and embodiments contained within the claims.

I claim:

1. A combined drilling guide and inspection read-out device for systems of the perforated matrix card type, comprising a support for holding a plurality of superposed matrix cards in edge wise alignment, and card locating formations carried by said support; a rigid bar extending adjacent and parallel to one of said locating formations along one lateral edge of said support, means defining a row of tooth-like serrations fixed on said bar and extending parallel to its length, a cursor slidably mounted for motion along said bar and having an arm extending perpendicular to said bar substantially across said support, and a retractable toothed element on said cursor for selective engagement with said serrations to establish the position of said cursor along said bar; one longitudinal edge of said cursor arm being provided with spaced semicircular indentations along its length and a numerical scale corresponding to said indentations to provide a precise numerical position read-out for card perforations occurring along the edge-line of said arm; and a row of circular drill-guiding holes parallel to said edge of said arm and inward thereof, each hole being aligned with one of said indentations and with the subdivisions of said scale.

2. A device in accordance with claim 1, and magnetic means carried by said cursor for holding it in sliding contact with said rigid bar.

3. A device in accordance with claim 1, including resilient means biasing said toothed element into engagement with said serrations.

References Cited in the file of this patent

UNITED STATES PATENTS

| | | |
|---|---|---|
| 456,105 | Adams | July 14, 1891 |
| 1,208,266 | Beaumont | Dec. 12, 1916 |
| 2,548,197 | Connor | Apr. 10, 1951 |
| 2,568,575 | Wickman | Sept. 18, 1951 |
| 2,756,822 | Jones | July 31, 1956 |
| 3,052,150 | Jonker | Sept. 4, 1962 |

FOREIGN PATENTS

| | | |
|---|---|---|
| 232,680 | Switzerland | Sept. 1, 1944 |